United States Patent
Watanabe

[11] Patent Number: 6,020,989
[45] Date of Patent: Feb. 1, 2000

[54] LAMINATED BODIES AND WINDOWS USING THEM

[75] Inventor: Haruo Watanabe, Tokyo, Japan

[73] Assignee: Affinity Co., Ltd., Tokyo, Japan

[21] Appl. No.: 09/021,876

[22] Filed: Feb. 11, 1998

[30] Foreign Application Priority Data

May 14, 1997 [JP] Japan ................................. 9-137947

[51] Int. Cl.⁷ ........................................... G02F 1/01
[52] U.S. Cl. ................................. 359/288; 359/289
[58] Field of Search ................................ 359/288, 289, 359/237, 238, 240

[56] References Cited

U.S. PATENT DOCUMENTS

| | | | |
|---|---|---|---|
| 4,169,661 | 10/1979 | Yamada et al. | 350/353 |
| 4,772,506 | 9/1988 | Siol et al. | 428/212 |
| 4,832,466 | 5/1989 | Nishimura et al. | 350/354 |
| 4,877,675 | 10/1989 | Falicoff et al. | 428/204 |
| 5,615,040 | 3/1997 | Watanabe | 359/288 |

FOREIGN PATENT DOCUMENTS

| | | |
|---|---|---|
| 41-19256 | 9/1966 | Japan . |
| 52-134456 | 11/1977 | Japan . |
| 61-7948 | 3/1986 | Japan . |
| 63-500042 | 1/1988 | Japan . |
| 6-255016 | 9/1994 | Japan . |

*Primary Examiner*—Georgia Epps
*Assistant Examiner*—Suzanne Letendre
*Attorney, Agent, or Firm*—Paul & Paul

[57] ABSTRACT

A laminated body comprising an aqueous solution, in which molecules dissolved in water aggregate upon increasing temperature to demonstrate cloudy light-scattering resulting in decrease in light transmittance, sealed between two substrates which are at least partially transparent to allow direct visibility of said aqueous solution, wherein said aqueous solution comprises 0.5 to 45 parts by weight of an amphipathic substance which exhibits a clouding point, is an oil at room temperature and dissolves uniformly in water at room temperature, dissolved in 100 parts by weight of a solution of 0.5 to 40 parts by weight of an ionic water-soluble polymer or a vinyl-based non-ionic water-soluble polymer exhibiting no clouding point at a temperature of not higher than about 45° C. in 100 parts by weight of water, and said aqueous solution undergoes a temperature-dependent reversible sol-emulsion phase transition, as well as a window employing it.

18 Claims, 2 Drawing Sheets

LAMINATED BODIES AND WINDOWS USING THEM

BACKGROUND OF THE INVENTION

1. Field of the Invention

The present invention relates to a laminated body comprising an aqueous solution which becomes cloudy to scatter and block light due to the action of heat resulting from absorption of light when it is irradiated with sunlight. The invention can be applied to buildings and automobiles and the like which have windows in which only the surface directly irradiated with light selectively blocks light and prevents glare. In addition, it can also be combined with a heating element for use in indoor windows of partitions, doors, etc. equipped with electronic curtains.

2. Description of the Related Art

In recent years, achieving more comfortable and energy-saving windows through effective use of sunlight has been a desirable goal in consideration of environmental compatibility. Although heat-reflecting glass and heat-absorbing glass are actually employed in windows, their use against daylight rays causes a problem by cutting off natural rays during winter, cloudy days and rainy weather, while also greatly reducing the feeling of openness and comfort. Therefore, adjustable glass has been desired, to allow blockage of light by a reversible change.

The present inventor focused on the energy of sunlight which is irradiated onto windows and investigated possibilities of the presence or absence of this energy causing a reversible change between transparency and light scattering as a self-response of the window glass, to provide a more comfortable living space. The inventor noted that such a property of self-response is very attractive not only from the standpoint of blocking light only on the irradiated surface and providing an energy-saving effect, but also in terms of finish, maintenance, support costs, etc. From this standpoint, photochromic systems, thermochromic systems or thermotropic systems may be selected for study, but their functioning mechanisms are complicated and thermochromic and thermotropic systems which depend only on the action of heat which can be easily controlled by manually adjusting the temperature when necessary, are superior to photochromic systems which depend on the light wavelength. The sunlight reaching earth is in the range of 290 nm to 2140 nm, of which about 80% is in the visible to near infrared range of 400 nm to 1100 nm, and also to be considered is the fact that the visible light range is larger than the near infrared light range. Thus, controlling the visible light range not only has a screening effect, but is also important for energy-saving and glare reduction effects. The present invention utilizes increasing temperature of objects, caused by sunlight energy. A heating element may, of course, be added for artificial temperature control to create a light-scattering condition to block out light.

At the current time, materials used in thermochromic and thermotropic systems have inadequate characteristics and are still impractical. For thermochromic glass and thermotropic glass to become widely used, the following conditions must be satisfied.

1. The phase change between transparency and opacity must be reversible.
2. The reversible change must be repeatable without phase separation.
3. The temperature at which phase transition begins must be low.
4. The glass must be durable.
5. The materials must not be toxic or environmentally polluting.

The present inventor has focused on aqueous solutions which undergo phase transition from a colorless, transparent state to a cloudy light-scattering state upon a temperature increase in the aqueous solution, as a self-responding material capable of satisfying these conditions.

Solutions known to be altered to a cloudy light-scattering state by a temperature increase include non-ionic surfactants which exhibit the phenomenon of a clouding point but, although this application was also studied, it will be understood as obvious that phase separation readily occurred with increase in temperature and the above conditions 1 and 2 were not satisfied. Also, aqueous solutions of certain non-ionic water-soluble polymers (e.g. hydroxypropyl cellulose, poly-N-isopropylacrylamide, polyvinyl methyl ether, etc.), which undergo aggregation and gelation with rising temperature to exhibit a clouding and light-scattering effect were also studied for similar applications (Japanese Examined Utility Model Publication 41-19256, Japanese Unexamined Patent Publication No. 52-62502, Japanese Examined Patent Publication No. 61-7948), but they, too, failed to satisfy conditions 1 and 2 and were therefore impractical. Furthermore, applications of hydrogels have been attempted to utilize the change to cloudiness of hydrogels made of special reaction mixtures with at least 5 components, as described in Japanese Unexamined National Patent Publication No. 63-500042, but here as well, they cannot satisfy conditions 1 and 2 and are therefore impractical. Also studied have been crosslinking hydrogels such as poly-N, N'-methylenebisacrylamide gels obtained by aqueous solution polymerization of N-isopropylacrylamide in the presence of a water-soluble radical polymerization initiator, using a small amount of N,N'-methylenebisacrylamide as the crosslinking agent, but these also fail to satisfy conditions 1 and 2 and are therefore impractical. Thus, the present inventors have invented a useful laminated body based on a study of a new method and the finding that by utilizing the principle of sol-gel phase transition based on composition as described in Japanese Unexamined Patent Publication No. 6-255016, a non-ionic water-soluble polymer which undergoes aggregation to become cloudy and light-scattering is reversibly altered in a uniform manner without phase separation. The present inventor also carried out diligent research on the use of oily amphipathic substances with clouding points, which have been ignored so far, because of ready phase separation between the aqueous and oil layer in high temperature ranges. As a result, the present invention has been accomplished upon the discovery of an aqueous solution which uniformly undergoes a reversible change by sol-emulsion phase transition.

SUMMARY OF THE INVENTION

The inventor has discovered an aqueous solution of an amphipathic substance with a clouding point, which is oily at room temperature and uniformly dissolves in room-temperature water, which aqueous solution composition undergoes stable and reversible change by temperature-dependent sol-emulsion phase transition without undergoing phase separation between the aqueous layer and oily layer upon temperature increase, and has thereby completed the present invention which is a laminated body containing an aqueous solution which undergoes a reversible change between a transparent state and a cloudy, opaque state, and windows employing it.

The present invention was accomplished in order to solve the problems described above, and it provides a laminated body comprising an aqueous solution, in which molecules dissolved in water aggregate upon increasing temperature to demonstrate cloudy light-scattering resulting in a decrease in light transmittance, sealed between two substrates which are at least partially transparent to allow direct visibility of the aqueous solution, wherein the aqueous solution comprises 0.5 to 45 parts by weight of an amphipathic substance which exhibits a clouding point, is an oil at room temperature and dissolves uniformly in water at room temperature, dissolved in 100 parts by weight of a solution of 0.5 to 40 parts by weight of an ionic water-soluble polymer or a vinyl-based non-ionic water-soluble polymer exhibiting no clouding point at a temperature of not higher than about 45° C. in 100 parts by weight of water, and said aqueous solution undergoes a temperature-dependent reversible sol-emulsion phase transition. The present invention further provides a window employing a laminated body comprising an aqueous solution, in which molecules dissolved in water aggregate upon increasing temperature to demonstrate cloudy light-scattering, resulting in decrease in light transmittance, sealed between two substrates which are at least partially transparent to allow direct visibility of the aqueous solution, wherein the laminated body contains an aqueous solution comprising 0.5 to 45 parts by weight of an amphipathic substance which exhibits a clouding point, is an oil at room temperature and dissolves uniformly in water at room temperature dissolved in 100 parts by weight of a solution of 0.5 to 40 parts by weight of an ionic water-soluble polymer or a vinyl-based non-ionic water-soluble polymer exhibiting no clouding point at a temperature of not higher than about 45° C. in 100 parts by weight of water, and said aqueous solution undergoes a temperature-dependent reversible sol-emulsion phase transition.

DESCRIPTION OF THE PREFERRED EMBODIMENTS

Figure 1:
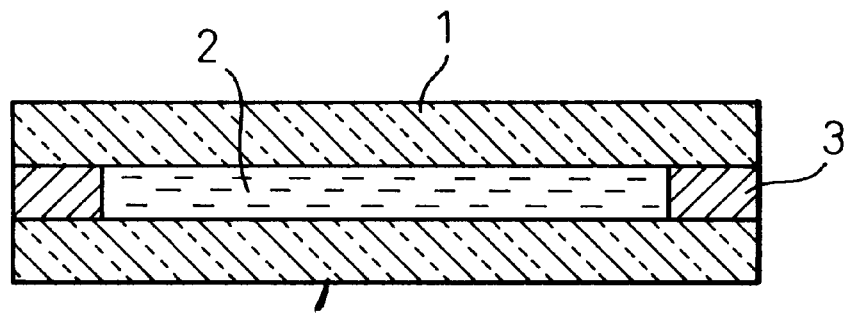
FIG. 1 is a cross-sectional view of an embodiment of the laminated body according to the invention.

The basic principle of the invention is the utilization of the phenomenon of the clouding point of the aqueous solution of a uniformly dissolved amphipathic substance, whereby heating causes the amphipathic substance to aggregate and become cloudy and light-scattering. Aqueous solutions of amphipathic substances which exhibit this clouding phenomenon have tended to undergo phase separation between the oily layer and aqueous layer upon temperature increase, making it impossible to achieve a uniform reversible change. Here, the present inventor conducted diligent research in search of an aqueous solution capable of stably and uniformly undergoing reversible change between a transparent state and cloudy state by changes in temperature. As a result it was found, surprisingly, that by addition of amphipathic substances to aqueous solutions of water-soluble polymers, a reversible change can be achieved which is both uniform and stable. It is believed that this occurs because fine aggregates of the amphipathic substance which have aggregated due to the temperature increase are trapped in the water-soluble polymer chains, thus maintaining a uniform fine dispersion state. Presumably, this prevents further aggregation of the fine aggregates into larger aggregates, thereby preventing separation of an aqueous layer and an oily layer. Accordingly, a cloudy light-scattering effect is exhibited by the difference in refractive indexes of the fine aggregates of the amphipathic substance and the aqueous polymer solution medium. This may be restated as follows. The aqueous solution of the invention was a transparent solution in a sol state at low temperatures, with the amphipathic substance uniformly dissolved in the water, but at high temperatures, the amphipathic substance aggregated to produce a white turbid emulsion state. This emulsion state was stabilized by the emulsifying effect of the water-soluble polymer. As a result it was possible to achieve a reversible change which could be called a sol-emulsion phase transition. Thus, the present invention is a laminated body comprising an aqueous solution based on 3 components, a water-soluble polymer, an amphipathic substance which possesses the phenomenon of a clouding point, and pure water.

Useful water-soluble polymers according to the invention will now be discussed. The water-soluble polymer used may be either ionic or non-ionic. Ionic water-soluble polymers can form highly viscous aqueous solutions at low temperature, depending on their molecular weight. Specific examples include the cellulose derivatives such as sodium carboxymethyl cellulose (for example, CMC Daicel by Daicel Chemical Industries, Ltd.), vinyl-based polymers such as sodium polyacrylate (Aqualic-IH, Aqualic DL-522 by Nippon Shokubai Co., Ltd.) and sodium polystyrenesulfonate, examples of vinyl monomer copolymers with anionic and non-ionic groups include A181 and A161 by Aronfloc Co., Ltd., examples of vinyl monomer copolymers with cationic and non-ionic groups include C-303, C-302, C-508 nd C-500 by Aronfloc Co., Ltd. and Isoban-110 by Kuraray Co., Ltd. which is an ionated copolymer of isobutylene and maleic anhydride, examples of modified polyvinyl alcohol include KEPS-1224A by Daiichi Kogyo Seiyaku Co., Ltd. which has carboxyl groups added to the hydroxyl groups of polyvinyl alcohol via methylene groups, at about 12% with respect to the hydroxyl groups, CM-318 by Kuraray Co., Ltd. which has a cationic quaternary ammonium salt group on the backbone chain, and Gohseran L3266, L0301 and F78 by Nippon Gohsei Co., Ltd. which contain a sulfuric acid group. Such many materials can be used, and the initial cloudiness temperature of the laminated body of the invention also varied depending on the structure, molecular weight and concentration of the polymer. Naturally, a larger molecular weight increased the viscosity and thus maintained the uniform emulsion state even at low temperatures. Accordingly, there is no need for particular restrictions on the molecular weight so long as it is of high molecular weight. When the molecular weight was low, however, the emulsifying action of the polymer was weak, and increasing the concentration made it difficult to achieve a transparent state. The molecular weight will depend on the structure, but may generally be at least 20,000, and preferably at least 50,000, in terms of weight average molecular weight, and although increasing molecular weight results in thickening and difficulty of dissolution in water, it is sufficient if uniformly dissolved in the water, and most commonly available polymers will have a molecular weight of no greater than a few million. The concentration may be about 0.5 part by weight to about 20 parts by weight, and preferably about 1.5 parts by weight to about 15 parts by weight, and even more preferably about 2 parts by weight to about 10 parts by weight, with respect to 100 parts by weight of water. Also, the clouding initiation temperature shifted toward a lower range as the concentration increased. Water-soluble polymers with higher density of ionic functional groups exhibited a more abrupt change from the initial clouding temperature to the saturated clouding temperature, and tended to have greater cloudy light-blocking properties.

A wide range of vinyl-based non-ionic water-soluble polymers can also be used for the invention. Examples include polyvinyl alcohol, polyvinylpyrrolidone and polyvinylacrylamide. Other examples are non-ionic water-soluble polymers which have a pendant group added to the side chain of polyvinyl alcohol (for example, OKS-9065N by Nippon Gohsei Co., Ltd., an oxypropylene group-containing polyvinyl alcohol). The molecular weight will depend on the type of polymer, but in terms of weight average molecular weight it may generally be at least 10,000, preferably at least 15,000 and more preferably at least 20,000, and with higher molecular weights the only problem is more difficult dissolution in water, which need not constitute a restriction so long as uniform dissolution in the water is achieved; however, most commonly available polymers will have a molecular weight of no greater than a few million. The concentration may be about 1 to 40 parts by weight, and preferably about 5 to 35 parts by weight, with respect to 100 parts by weight of water. However, vinyl-based non-ionic water-soluble polymers, which dissolve to a transparent state in water at room temperature but at higher temperatures aggregate to gelation and precipitation, causing phase separation, are difficult to be kept uniform in an aqueous solution. More concretely, they are water-soluble polymers which cause phase separation by aggregating to gelation and precipitation at temperatures of below about 45° C. (for example, poly-N-isopropylacrylamide and polyvinyl methyl ether). Accordingly, the vinyl-based non-ionic water-soluble polymers which are useful for the invention are polymers which do not exhibit the phenomenon of a clouding point at temperatures below about 45° C.

The present inventors concentrated on sodium carboxymethyl cellulose as an ionic water-soluble polymer which is weather resistant and dissolves uniformly in water. Examples thereof include CMC Daicel 1170, 1220, 1260, 1290, 1330, 1380 and 2260 by Daicel Chemical Industries, Ltd., and a wide variety may be used without any particular restrictions on molecular weight or degree of etherification. Also, the pH of their aqueous solutions of near neutral is important from the standpoint of durability. If the pH strays from neutral, depolymerization of the cellulose skeleton and degradation of the amphipathic substance will progress, thus considerably reducing the durability. Polyvinyl alcohols are vinyl-based non-ionic polymers which are weather resistant and dissolve uniformly in water, and examples thereof include Gohsenol NH-26, NL-05, GH-20, GL-03, KL-11 and NH-17Q by Nippon Gohsei Co., Ltd., among which a wide a variety may be used without any particular restrictions on molecular weight or degree of saponification. As mentioned above, modified polyvinyl alcohols were also useful. Thus, water-soluble polymers which dissolve uniformly in water and are weather resistant in an aqueous solution state are particularly useful. However, the condition of weather resistance is less important in the case of indoor use (for example, partitions) with added heating elements.

Amphipathic substances which are useful according to the invention are compounds with a clouding point which are oils at room temperature and dissolve uniformly in room-temperature water. Many amphipathic substances are known, and examples include propylene oxide polymers (for example, the Newpol PP Series by Sanyo Chemical Industries, Ltd.), copolymers of low molecular weight propylene oxide and ethylene oxide (for example, Epan 420 and 720 by Daiichi Kogyo Seiyaku Co., Ltd.), poly(oxyethylene/oxypropylene) glycol monoether (for example, butyl alcohol derivatives of the Newpol 50HB Series by Sanyo Chemical Industries, Ltd.), triols which are derivatives containing oxypropylene groups or oxyethylene/oxypropylene groups (for example, the Newpol/GP Series, TP Series, GL Series, GEP Series and TL series by Sanyo Chemical Industries, Ltd.), as well as compounds with polyoxyethylene added to higher alkyl phenols (for example, the nonyl phenol Liponox NC-86 by Lion Corp.), and compounds with polypropylene oxide and polyethylene oxide added to higher alkyl groups (such as alkyl groups of 12 and 13 carbon atoms) (for example, Leocol SC-70 and Leocol SC-80 by Lion Corp.). In addition, silicone compounds, including modified dimethylpolysiloxanes with oxyethylene and oxypropylene added (for example, KF6008, KF6012 and KF615A by Shin-Etsu Chemical Co., Ltd., TSF4450, TSF4452 and TSF4440 by Toshiba Silicone Co., Ltd. and SH3748, SH3749, SH8700 and SF8410 by Toray-Dow Corning Silicone Co., Ltd.) were also highly useful for the invention. As is already known, the initial clouding temperature can be controlled by the proportion of the oxyethylene and oxypropylene (for example, a proportion of 1:1).

Amphipathic substances with a clouding point which are oils at room temperature and dissolve uniformly in room-temperature water can be defined in the following manner. Being an oil at room temperature means being liquid at a temperature near room temperature, more specifically at 25° C. Also, dissolving uniformly in room-temperature water means that the amphipathic substance dissolves uniformly to a transparent state or near-transparent state without phase separation when the necessary amount thereof is added to water at a temperature below that at which the clouding phenomenon is exhibited. More specifically, it means that a 2 wt % aqueous solution is uniformly dissolved to a transparent state or near-transparent state without phase separation at a temperature below that at which the clouding phenomenon is exhibited. For example, in the case of propylene oxide polymers (such as the Newpol PP Series by Sanyo Chemical Industries, Ltd.), if the molecular weight is too small no self-aggregation will occur and thus no cloudy light-scattering will be exhibited, and if the molecular weight is too large it will fail to uniformly dissolve even at low temperatures, and no transparent state will be achieved. Accordingly, the weight average molecular weight is preferably from about 400 to 1,000. Also, with low molecular weight copolymers comprising only propylene oxide and ethylene oxide, if the content of ethylene oxide is as low as about 10% the copolymer will fail to uniformly dissolve even at low temperatures, and no transparent state will be achieved, while if it is as high as about 40% no self-aggregation will occur and thus no cloud light-scattering will be exhibited. Accordingly, the preferred ethylene oxide content was determined to be about 15%–30%.

The amount of the amphipathic substance to be added will depend on its solubility in water, but generally smaller amounts resulted in fainter cloudiness and light scattering while increasing amounts produced stronger cloudiness. However, when the amount was too high a cloudy state was exhibited instead of a transparent state even in the low temperature range, rendering it unsuitable for the invention.

However, in the case of amphipathic substances which adequately dissolve in room-temperature water, such as Newpol/GP600 by Sanyo Chemical Industries, Ltd., they could be added even in large amounts. Thus, the amount of the amphipathic substance added may be 0.5 to 45 parts by weight, and preferably 1 to 40 parts by weight, with respect to 100 parts by weight of the aqueous solution of the water-soluble polymer. The molecular weight of the amphipathic substance will depend on the molecular structure, but the weight average molecular weight is preferably from about 240 to 20,000. Hydrocarbon-based amphipathic substances may be used at weight average molecular weights of about 240 to 10,000, preferably weight average molecular weights of about 240 to 8,000, and more preferably weight average molecular weights of about 240 to 5,000. Molecular weights of over 10,000 are not practical since their synthesis and purification is difficult. Polysiloxane systems, because of the large atomic weight of silicon, are not necessarily restricted to molecular weights of about 20,000 and lower, but for the same reason, because of the functional groups added to the side chains, those of over 20,000 are difficult to produce and are therefore impractical. Polysiloxane systems should have large molecular weights in order to obtain the effect of the siloxane chain, and weight average molecular weights of about 1000 to about 20,000, preferably weight average molecular weights of about 2000 to 18,000 and more preferably weight average molecular weights of about 3000 to 15,000, are suitable.

For example, when modified dimethylpolysiloxane was added to and dissolved in an aqueous solution of the ionic water-soluble polymer carboxymethyl cellulose, it exhibited total transparency in the low temperature range, and then became abruptly cloudy for a strong light-blocking property. In particular, the temperature difference from the initial cloudiness until essentially saturated cloudiness was extremely abrupt at about 5° C. Laminated body C of Example 5 exhibited its initial cloudiness at about 30° C. and reached essential saturation of its light-blocking property at about 35° C. It was possible to control the degree of opacity due to the cloudy light scattering by varying the amount of the modified dimethylpolysiloxane added. The cloudiness initiation temperature could also be adjusted by varying the concentration of carboxymethyl cellulose, with higher concentrations resulting in lower initiation temperatures. It was thus possible to vary the light-blocking property and the initiation temperature even by adjusting the concentration. Concerning the degree of etherification of the carboxymethyl cellulose, when it was 0.7 or lower a faint mist appeared even in the transparent state at the low temperature range, hampering visibility although there was sufficient change in the cloudy light blockage. In most cases an esterification degree of 0.8–1.5 is satisfactory, and a tendency toward an abrupt change in cloudiness was observed as the esterification degree increased above 1.0. At 1.5 and greater, synthesis becomes very difficult and no longer practical. Also, the molecular weight of the carboxymethyl cellulose can be in a wide range which gives a viscosity in the range of from CMC Daicel 1220/10 cps to CMC Daicel 2260/6000 cps as measured with a rotational viscometer in 1% aqueous solution/25° C., and there was no particular restriction on the molecular weight.

The water may ordinarily be distilled water, pure water or the like. In order to shift the cloudiness initiation temperature to the low temperature end for non-ionic water-soluble polymer aqueous solutions, a neutral inorganic salt (for example, sodium chloride, potassium chloride, lithium chloride, sodium nitrate, sodium sulfate) may be added. It may be added in an amount of 0.1 part by weight to 10 parts by weight to 100 parts by weight of the non-ionic water-soluble polymer aqueous solution. However, it was found to be undesirable to add such salts to ionic water-soluble polymers because they affect the ion dissociation and thus influence the homogeneity and viscosity. The pH of the aqueous solution used for the invention may be near neutral 7, or from 6 to 8, or more preferably in a range from 6.5 to 7.5. In addition, appropriate amounts of antioxidants, coloring agents, preservatives, ultraviolet absorbers and the like may also be used as additives. By deaerating the dissolved oxygen or displacing it with an inert gas, it is possible to prevent oxidative deterioration and is preferred for long-term uses such as windows.

When the laminated body is to be used as a window, it may be a window either of the type which has a weak light-blocking property but provides visibility and can also prevent glare, or of the type which has a strong light-blocking property and an adequate energy-saving effect. As an example of the former type, the inventor prepared aqueous solution A, which is colorless and transparent at 20° C., by adding 7 parts by weight of polyoxypropylene 2-ethyl-2-hydroxymethyl-1,3-propanediol with an average molecular weight of 400 (Newpol TP-400 by Sanyo Chemical Industries, Ltd.), to 100 parts by weight of an aqueous polymer solution of 1 part by weight of polyvinyl alcohol with a weight average molecular weight of about 20,000 (Gohsenol GL-03 by Nippon Gohsei Co., Ltd.) dissolved in 2 parts by weight of a 5 wt % aqueous sodium chloride solution. As an example of the latter type, the inventor prepared aqueous solution B, which is also colorless and transparent at 20° C., by adding 6 parts by weight of poly(oxyethylene/oxypropylene) methylpolysiloxane (KF6012 by Shin-Etsu Chemical Co., Ltd.), to 100 parts by weight of an aqueous polymer solution of 2 parts by weight of carboxymethyl cellulose (CMC Daicel 1220: weight average molecular weight approximately 50,000, product of Daicel Chemical Industries, Ltd.) dissolved in 30 parts by weight of pure water. Next, aqueous solution A and aqueous solution B were each applied to 0.3 mm thickness between 10 cm-square, 3 mm-thick soda lime glass plates to prepare laminated body A and laminated body B. The laminated bodies both had satisfactory reversible stability at room temperature and 60° C., and satisfactory stability upon standing at 60° C. for 12 hours, without phase separation. Also, laminated body A began to exhibit cloudy light scattering from about 26° C. and slowly increasing cloudy light blockage with temperature, while faint visibility was confirmed even at about 42° C., and the anti-glare effect was also satisfactory. Laminated body B began to exhibit cloudy light scattering from about 24° C., reaching saturation at about 29° C. and providing strong light blockage.

Figure 4:
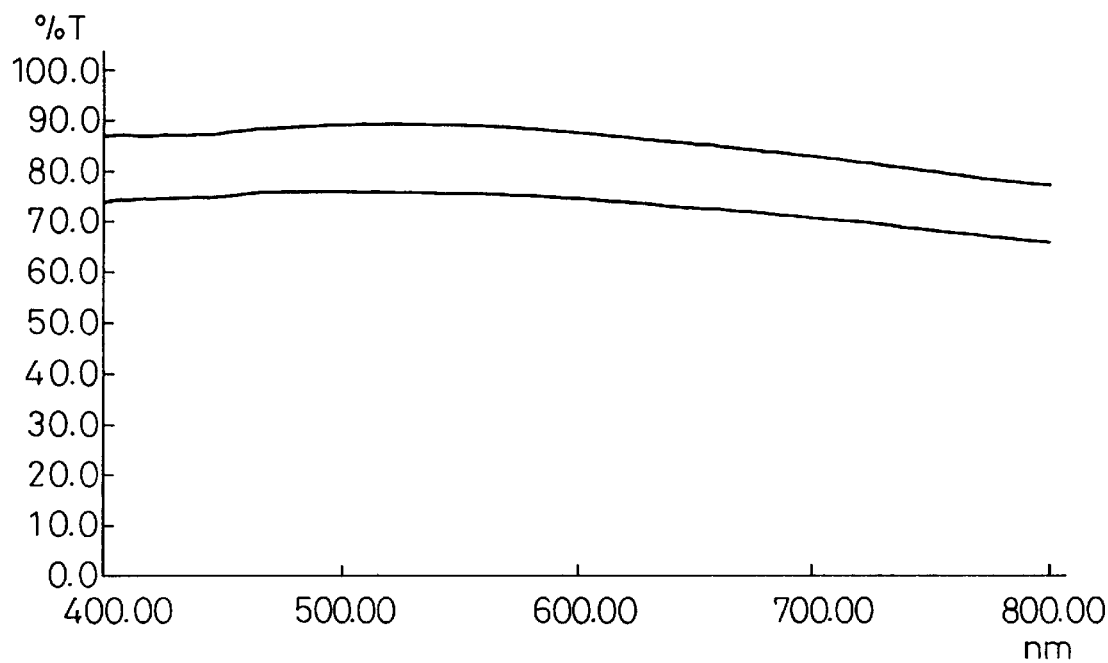
FIG. 4 is a graph showing the change in light transmittance in the wavelength range of 400 nm to 800 nm for a laminated body according to the invention.
Figure 5:
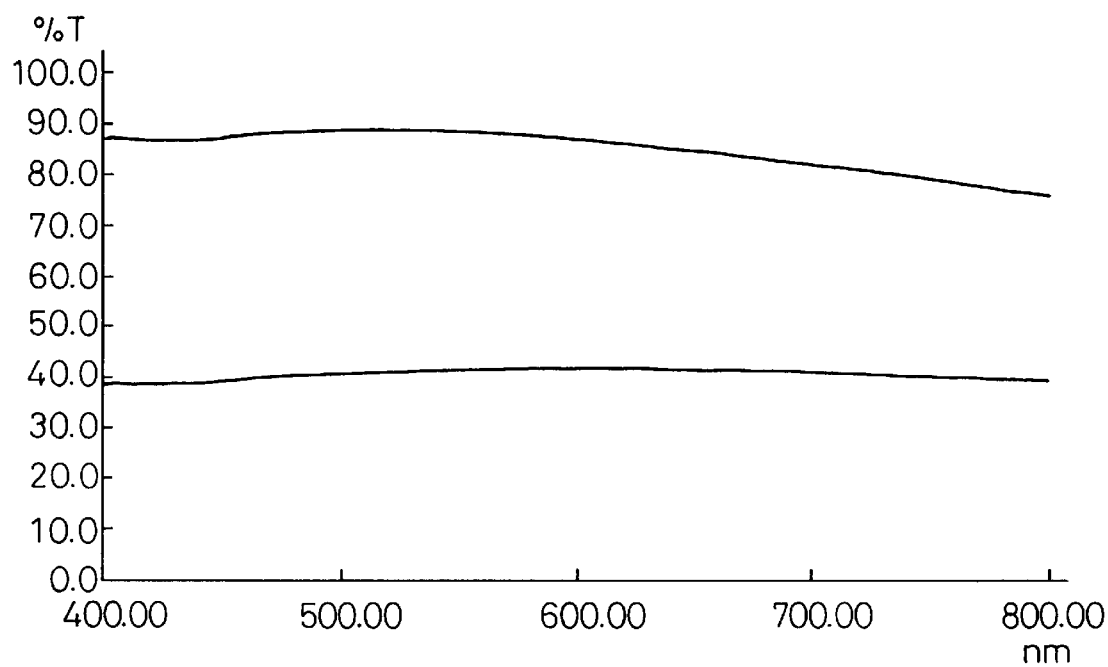
FIG. 5 is a graph showing the change in light transmittance in the wavelength range of 400 nm to 800 nm for a laminated body according to the invention.

Next, a U-4000 spectrophotometer manufactured by Hitachi, Ltd., suitable for measurement of large light-scattering samples, was used for measurement by positioning each laminated body so that its center section was in close proximity to (about 1 mm from) the window of the integrating sphere. The measuring temperatures were room temperature of about 21° C. for the low temperature range and about 42° C. for the high temperature range. Considering the temperature change of the laminated bodies during measurement, the measuring wavelength was limited to light between 400 nm and 800 nm, at about 21° C. (transparent state) and about 42° C. (cloudy light-scattering state). The results are shown in FIG. 4 and FIG. 5. FIG. 4 shows laminated body A and FIG. 5 shows laminated body B. Confirmation was made with light of wavelength from 300 nm to 400 nm and from 800 nm to 2,500 nm, and light blockage was exhibited in the ultraviolet range and infrared range, similar to the visible light range.

The structure of the laminated body of the invention and its use in windows will now be explained. FIGS. 1, 2, 3A and 3B are schematic cross-sectional illustrations of embodiments of laminated bodies according to the invention, wherein 1 indicates the substrates, 2 is the aqueous solution and 3 is a sealant.

The laminated body of FIG. 1 has the basic form of a laminated body according to the invention, wherein the aqueous solution 2 is laminated between the substrates 1 which are at least partially transparent and allow the aqueous solution 2 to be directly visible. The layer thickness of the aqueous solution 2 is not particularly restricted, but it may be from about 0.01 mm to 2 mm, and sufficient light blockage can be achieved with a thickness of about 0.2 mm. The sealant 3 serves to prevent evaporation of the water, and it may be provided around the perimeter between the substrates or on the outside of the substrates. Sealants which may be used include epoxy-based resin adhesives (for example, Flep by Toray-Thiocoll Co.), acrylic-based resin adhesives (for example, Photobond, a photosensitive resin manufactured by Sunrise Meisei Co.), and isobutylene sealants, polysulfide sealants, urethane sealants and silicone sealants which are used for sealing of insulating glass. In particular, though not shown, it was found preferable to provide at least a double sealant between the substrates, with an isobutylene sealant (inner) and a sealant with adhesion to the glass substrate (outer). Naturally, if contact between the isobutylene sealant and the aqueous solution 2 is inconvenient, a barrier layer may be provided to avoid such contact.

In order to guarantee control of the thickness, though not specifically shown, a spacer material (such as glass beads, ceramic beads, resin beads or metallic beads) may be used in the aqueous solution 2, instead of a sealant. A spacer material is useful for maintaining the liquid layer thickness especially for sizes of 50 cm square and larger. Also, substances with refractive indexes near that of the aqueous solution 2 are preferred because they will be more difficult to discern. A wide variety of spacers, including steel wool, glass fibers, thin plates and the like, may be used for the sealing sections.

The substrates should have at least one portion that is transparent and allows the aqueous solution 2 to be directly visible, and a number of different materials may be used including glass, plastic, ceramics, metals, etc. which, if in the form of panels, may be simple or composite materials with the surfaces worked, in various combinations as desired. Glass panels used as window materials may be simple single-panel glass, reinforced glass, wired glass, heat-absorbing glass, heat-reflecting glass, heat-absorbing/reflecting glass, sandwich glass, ultraviolet cutting glass, transparent conductive glass, insulating glass, multi-layered glass, transparent single-panel glass or polycarbonate composite glass, etc., and a pair of substrates of appropriate combinations of different types and thicknesses may also be used depending on the purpose. In particular, composites of multilayered glass give laminated bodies with both thermal insulating properties and light-blocking properties, and are very useful in terms of energy savings and comfort.

When the present invention is used for a window, it is subjected to direct sunlight rays over very long periods, and therefore ultraviolet cutting glass is preferably used at least on the outer side of the substrate. Examples include green glass, glass coated with an ultraviolet absorbing layer and ultraviolet absorbing sandwich glass. When substrate thickness on the outer side of the window is at least about 5 mm, the penetration of ultraviolet rays of wavelength 330 nm and lower is drastically reduced, and therefore thicker substrates are naturally advantageous for selective light blockage since the ultraviolet absorbance also increases with greater thickness. Windows are sometimes used horizontally and sometimes vertically, and for vertical situations it was necessary to take particular care to avoid excessively low viscosity of the aqueous solution 2, as this sometimes results in irregular convection due to temperature differences.

Figure 2:
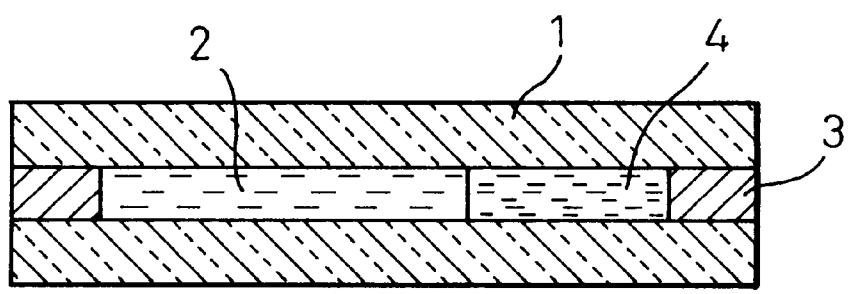
FIG. 2 is a cross-sectional view of another embodiment of the laminated body according to the invention.

The laminated body of FIG. 2 is a laminated body wherein an aqueous solution 2 which undergoes reversible change and a transparent liquid 4 which does not change are combined and situated between the same substrates. The transparent liquid 4 which does not undergo reversible change is a liquid or gel for which the light transmittance is not particularly affected even with increasing temperature. An example thereof is an aqueous solution according to the invention with no amphipathic substance added. As the molecular weight increases the self-diffusion reaches a negligible level, and it should therefore be at least 2000, preferably at least 3000 and more preferably at least 5000. The visibility can also be guaranteed by providing a liquid which is immiscible with water (for example, liquid paraffin, silicone oil, silicone gel, etc.). Additional modifications, not specifically shown, include laminated bodies wherein the layer thickness of the aqueous solution 2 is continuously varied for continuous adjustment of the degree of the cloudy opaque state, and laminated bodies wherein irregularities are provided in the substrates to alter the layer thickness of the aqueous solution 2 for guaranteed visibility. These can be used to ensure partial visibility, for example in automobile rear windows and in advertising devices which display image data. Methods providing heating elements also exist, offering a wider range of uses for laminated bodies of the invention. They can also serve as partitions to block the line of vision by artificial thermal control, as an electronic curtain. Heating elements include transparent conductive films, carbon pastes, metal pastes, metal wires and barium titanate-based ceramics, and heating elements that can be both heated and cooled (e.g., Thermopanel manufactured by Komatsu Electronics Co., Ltd.) may also be used. The heating device can be placed either on the inner side or the outer side of the substrate and over the entire surface of the substrate or only a portion thereof. The heating element may also be divided into a lined or striped arrangement. In addition, image data may also be displayed by using a heating element formed into a matrix or by selectively heating the substrate surface with infrared rays (such as from a laser).

Examples of windows according to the invention include ordinary building windows, windows of vehicles such as automobiles and railroad cars, and windows of transportation machinery such as ships, airplanes and elevators. "Window" is referred to in the broad sense, and includes the glass ceilings of shopping arcades and atriums, door windows and partitions, as well as completely transparent glass doors, columns and walls. Naturally, as examples of wider applications, the present invention also encompasses laminated bodies combined with construction material sashes or vehicle frames to form laminated bodies equipped with frames suited for respective applications in buildings, vehicles and the like, and window units which are simply installed at construction sites in the same manner as conventional ones. The use of such unit structures is effective for allowing more reliable sealing of the laminated body, preventing evaporation of water due to penetration, and preventing deterioration of the sealing layer by light. This is particularly effective for semi-permanent use or use under harsh conditions as is the case with windows of ordinary buildings and vehicle windows.

Figure 3A:
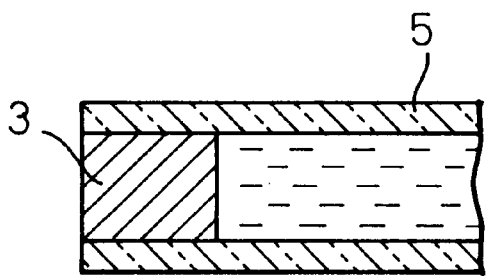
FIGS. 3A and 3B are cross-sectional views of a further embodiment of the laminated body according to the invention.
Figure 3B:
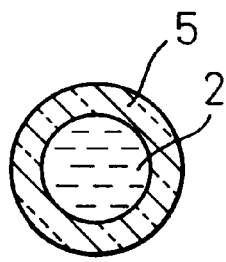

Moreover, the laminated body of the invention also encompasses a method of use wherein the aqueous solution is contained in hollow bodies, spheres, microcapsules or a resin sheet for application and lamination into a sheet, provided that a portion is transparent and the aqueous solution is directly visible. Particularly useful are hollow rods as shown in FIG. 3. A wide variety of cross-sectional shapes, including circular, hexagonal, square, triangular and flat, may be employed to fit the purpose. Also, the sealant may be the glass fused for total sealing. In addition, arranging a large number of the hollow rods in a plane, they can be used to carry out the function of blocking light. Examples of such uses are roller screens and blinds. Naturally, the hollow rods can also be situated between a pair of substrates. Thus, the hollow rod in FIGS. 3A and 3B is also within the scope of the invention under the broad definition of laminated bodies. In addition, laminated bodies which are sheet objects shaped into cup or basin forms are also encompassed within scope of the invention.

Examples will now be presented for further explanation of the invention, with the understanding that the invention is in no way to be limited by these examples.

EXAMPLE 1

An aqueous solution which was colorless and transparent at 20° C. was prepared by adding 35 parts by weight of a triol, polyoxypropylene glycerine with a weight average molecular weight of 600 (Newpol GP-600 by Sanyo Chemical Industries, Ltd.), to 100 parts by weight of an aqueous polymer solution of 1 part by weight of polyvinyl alcohol with a weight average molecular weight of about 20,000 (Gohsenol GL-03 by Nippon Gohsei Co., Ltd., saponification degree of about 87.5%) dissolved in 2 parts by weight of pure water. A filamentous isobutyl sealant with a diameter of 2.4 mm was applied around the perimeter of a 30 cm-square, 3 mm-thick soda lime glass plate, the aqueous solution was situated at the center section of the plate, and after lightly placing an opposing plate against it, the opposing plate was pressed under reduced pressure of about 1 Torr in a vacuum apparatus to squash the isobutyl sealant and accomplish adhesion. A photosensitive resin with adhesiveness to glass was then allowed to flow in the gaps left around the outermost perimeter sections, and irradiation with light finished the sealing. As a result there was obtained a bubble-free laminated body with a thickness of 0.3 mm. The laminated body had satisfactory reversible stability at room temperature and 60° C., and satisfactory standing stability after 12 hours at 60° C., with no phase separation. Also, cloudy light scattering began to be observed from about 41° C., and cloudy light blockage increased steadily so that an anti-glare effect was confirmed while maintaining visibility.

EXAMPLE 2

Aqueous solution A and aqueous solution B which were colorless and transparent at 20° C. were prepared by adding 15 parts by weight of a monoether, poly(oxyethylene/oxypropylene) glycol butyl ether with a weight average molecular weight of 240 (Newpol 50HB-55 by Sanyo Chemical Industries, Ltd.) and 6.5 parts by weight of another monoether, poly(oxyethylene/oxypropylene)glycol butyl ether with a weight average molecular weight of 3750 (Newpol 50HB-5100 by Sanyo Chemical Industries, Ltd.), to 100 parts by weight of an aqueous polymer solution of 1 part by weight of the polyvinyl alcohol of Example 1 dissolved in 2 parts by weight of a 5 wt % aqueous sodium chloride solution. These were used to fabricate laminated body A and laminated body B in the same manner as Example 1. These two laminated bodies had satisfactory reversible stability at room temperature and 60° C., and satisfactory standing stability after 12 hours at 60° C., with no phase separation. Also, cloudy light scattering began to be observed from about 32° C. for laminated body A and from about 38° C. for laminated body B, and cloudy light blockage increased steadily so that an anti-glare effect was confirmed while maintaining visibility.

EXAMPLE 3

An aqueous solution which was colorless and transparent at 20° C. was prepared by adding 10 parts by weight of polyoxypropylene 2-ethyl-2-hydroxymethyl-1,3-propane diol of a weight average molecular weight of 400 (Newpol TP-400 by Sanyo Chemical Industries, Ltd.) to 100 parts by weight of an aqueous solution of 10 parts by weight of polyvinyl alcohol (Gohsenol NH-26 by Nippon Gohsei Co., Ltd., saponification degree of about 99.5%, weight average molecular weight of about 120,000) dissolved in 80 parts by weight of pure water. A laminated body was fabricated in the same manner as Example 1. The laminated body had satisfactory reversible stability at room temperature and 60° C., and satisfactory standing stability after 12 hours at 60° C., with no phase separation. Also, cloudy light scattering began to be observed from about 31° C., and cloudy light blockage increased steadily so that an anti-glare effect was confirmed while maintaining visibility.

EXAMPLE 4

An aqueous solution which was colorless and transparent at 20° C. was prepared by adding 6 parts by weight of polyoxypropylene-2-ethyl-2-hydroxymethyl-1,3-propanediol with a weight average molecular weight of 400 (Newpol TP-400 by Sanyo Chemical Industries, Ltd.) to 100 parts by weight of an aqueous polymer solution of 10 parts by weight of polyvinyl alcohol (Gohsenol NL-05 by Nippon Gohsei Co., Ltd., saponification degree of about 98.5%, weight average molecular weight of about 20,000) dissolved in 30 parts by weight of pure water. A laminated body was fabricated in the same manner as Example 1. The laminated body had satisfactory reversible stability at room temperature and 60° C., and satisfactory standing stability after 12 hours at 60° C., with no phase separation. Also, cloudy light scattering began to be observed from about 34° C., and cloudy light blockage increased steadily so that an anti-glare effect was confirmed while maintaining visibility.

EXAMPLE 5

Aqueous solution A, aqueous solution B, aqueous solution C and aqueous solution D which were colorless and transparent at 20° C. were prepared by adding 6.5 parts by weight, 1.5 parts by weight, 16 parts by weight and 32 parts by weight, respectively, of a poly(oxyethylene/oxypropylene)methyl polysiloxane (KF6012 by Shin-Etsu Chemical Co., Ltd.) to 100 parts by weight of an aqueous polymer solution of 2 parts by weight of sodium carboxymethyl cellulose (CMC Daicel 1260 by Daicel Chemical Industries, Ltd., etherification degree: 0.90) dissolved in 50 parts by weight of pure water. These were used to fabricate laminated body A, laminated body B, laminated body C and laminated body D in the same manner as Example 1. These four laminated bodies all had satisfactory reversible stability at room temperature and 60° C., and satisfactory standing stability after 12 hours at 60° C., with no phase separation. Also, cloudy light scattering began to be observed in laminated body A from about 30° C., with cloudy light blockage occurring abruptly with changing temperature and providing sufficient light blockage so that an anti-glare effect was confirmed. Laminated body B began to exhibit cloudy light scattering at about the same temperature as laminated body A, but even at higher temperature a sufficient anti-glare effect was confirmed while maintaining visibility. Laminated body C began to exhibit cloudy light scattering at about the same temperature as laminated body A, and cloudy light blockage occurred abruptly with changing temperature, with a stronger light blocking effect than laminated body A. Laminated body D began to exhibit cloudy light scattering at about the same temperature as laminated body A, but the light blocking property at a higher temperature of about 40° C. was about the same as that of laminated body C.

EXAMPLE 6

Aqueous solution A, aqueous solution B, aqueous solution C, aqueous solution D, aqueous solution E and aqueous solution F were prepared by adding 6.5 parts by weight of different poly(oxyethylene/oxypropylene)methyl polysiloxanes (KF615A by Shin-Etsu Chemical Co., Ltd., TSF4450, TSF4452 and TSF4440 by Toshiba Silicone Co., Ltd., and SH8700 and SF8410 by Toray-Dow Corning Silicone Co., Ltd., respectively) to 100 parts by weight of the carboxymethyl cellulose aqueous polymer solution of Example 5. These were used to fabricate laminated body A, laminated body B, laminated body C, laminated body D, laminated body E and laminated body F in the same manner as Example 1. These laminated bodies all had satisfactory reversible stability at room temperature and 60° C., and satisfactory standing stability after 12 hours at 60° C., with no phase separation. Also, cloudy light scattering began to be observed from about 41° C. for laminated body A, from about 5° C. for laminated body B, from about 25° C. for laminated body C, from about 65° C. for laminated body D, from about 30° C. for laminated body E and from about 33° C. for laminated body F, and cloudy light blockage occurred with changing temperature so that a sufficient anti-glare effect was confirmed. Thus, it was shown that by changing the type of poly(oxyethylene/oxypropylene)methyl polysiloxane used, it is possible to achieve reversible change with a uniform state across a wide temperature range from low temperature to high temperature. Particular features were also exhibited by the different rates of change in cloudiness.

EXAMPLE 7

Aqueous solution A and aqueous solution B were prepared by adding 6.5 parts by weight of propylene glycols with respective weight average molecular weights of 400 and 950 (Newpol PP-400 and PP950 by Sanyo Chemical Industries, Ltd.) to 100 parts by weight of the carboxymethyl cellulose aqueous polymer solution of Example 5. These were used to fabricate laminated body A and laminated body B in the same manner as Example 1. These laminated bodies had satisfactory reversible stability at room temperature and 60° C., and satisfactory standing stability after 12 hours at 60° C., with no phase separation. Also, cloudy light scattering began to be observed from about 60° C. for laminated body A and from about 18° C. for laminated body B, with sufficient light blockage upon changing temperature so that an anti-glare effect was confirmed.

EXAMPLE 8

An aqueous solution was prepared by adding 20 parts by weight of the TP-400 of Example 4 to 100 parts by weight of the aqueous polymer solution of Example 5 with 5 parts by weight of sodium carboxymethyl cellulose dissolved in 100 parts by weight of pure water. The solution was used to fabricate a laminated body in the same manner as Example 1. The laminated body had satisfactory reversible stability at room temperature and 60° C., and satisfactory standing stability after 12 hours at 60° C., with no phase separation. Also, cloudy light scattering began to be observed from about 25° C. for the laminated body and cloudy light blockage was exhibited abruptly with changing temperature.

EXAMPLE 9

KEPS-1224A by Daiichi Kogyo Seiyaku Co., Ltd., an ionic water-soluble polymer prepared by adding carboxyl groups to the hydroxyl groups of polyvinyl alcohol with a weight average molecular weight of about 100,000 to about 12% with respect to the hydroxyl groups, was purified by removing the organic salt with methanol. Aqueous solution A which is colorless and transparent at 20° C. was prepared by adding 10 parts by weight of KF6012 of Example 5 to 100 parts by weight of an aqueous polymer solution of 10 parts by weight of the purified KEPS-1224A dissolved in 100 parts by weight of pure water, and aqueous solution B which is also colorless and transparent at 20° C. was prepared by adding 10 parts by weight of TP-400 of Example 4 to 100 parts by weight of an aqueous polymer solution of 20 parts by weight of the purified KEPS-1224A dissolved in 100 parts by weight of pure water. These were used to fabricate laminated body A and laminated body B in the same manner as Example 1. The two laminated bodies both had satisfactory reversible stability at room temperature and 60° C., and satisfactory standing stability after 12 hours at 60° C., with no phase separation. Also, cloudy light scattering began to be observed from about 26° C. for laminated body A and from about 27° C. for laminated body B, and cloudy light blockage was exhibited abruptly with changing temperature, so that sufficient light blockage and an anti-glare effect were observed.

EXAMPLE 10

An aqueous solution which was colorless and transparent at 20° C. was prepared by adding 10 parts by weight of the KF6012 of Example 5 to 100 parts by weight of an aqueous polymer solution of 0.5 part by weight of sodium polyacrylate with a weight average molecular weight of about 5,000,000 (Aqualic IH by Nippon Shokubai Co., Ltd.) dissolved in 100 parts by weight of pure water. A laminated body was fabricated in the same manner as Example 1. The laminated body had satisfactory reversible stability at room temperature and 60° C., and satisfactory standing stability after 12 hours at 60° C., with no phase separation. Also, cloudy light scattering began to be observed from about 32° C., and the cloudy light blockage occurred abruptly with changing temperature, so that sufficient light blockage and an anti-glare effect were observed.

EXAMPLE 11

Aqueous solution A, aqueous solution B and aqueous solution C which were colorless and transparent at 20° C.

were prepared by adding 10 parts by weight, respectively, of Leocol SC-70, Leocol SC-80 and Liponox NC-86 by Lion Corp. to 100 parts by weight of an aqueous polymer solution of 5 parts by weight of the sodium polyacrylate of Example 10 dissolved in 100 parts by weight of pure water. Laminated body A, laminated body B and laminated body C were fabricated in the same manner as Example 1. These laminated bodies all had satisfactory reversible stability at room temperature and 60° C., and satisfactory standing stability after 12 hours at 60° C., with no phase separation. Also, cloudy light scattering began to be observed from about 32° C. for laminated body A, from about 38° C. for laminated body B and from about 32° C. for laminated body C, and sufficient cloudy light blockage was exhibited.

The effect of the invention is that of providing laminated bodies containing aqueous solutions which undergo reversible change between a transparent state and cloudy light-blocking state, based on the discovery of aqueous solution compositions comprising aqueous solutions of amphipathic substances with clouding points, which are oily at room temperature and uniformly dissolve in room-temperature water, and which undergo stable and reversible change by temperature-dependent sol-emulsion phase transition, without undergoing phase separation between their aqueous layers and oily layers upon temperature increase, as well as that of providing windows employing them. Upon adding amphipathic substances to aqueous solutions of water-soluble polymers, the present inventors found, surprisingly, that the resulting aqueous solutions cause excellent sol-emulsion phase transitions which can be stably and reversibly altered. This is believed to be explainable in that the fine aggregates of the amphipathic substance generated by heating became trapped in the water-soluble polymer chains and were held in a uniform emulsion state. As a result, cloudy light-blockage was caused by light scattering due to the difference in the refractive indexes of the fine aggregates and the medium. When such a laminate is applied as a window and the window is heated by direct contact with sunlight rays, the irradiated sections are selectively altered from a transparent state to a cloudy state, thus blocking the direct light rays and preventing glare. This change from a transparent to semi-transparent to opaque state occurred automatically due to the balance in the environmental temperature at the time, caused by the seasons or by the weather. Accordingly, it became possible to provide a self-responding energy-saving window which conveniently blocks direct sunlight rays by the direct energy of that sunlight.

I claim:

1. A laminated body comprising an aqueous solution, in which molecules dissolved in water aggregate upon increasing temperature to demonstrate cloudy light-scattering resulting in decrease in light transmittance, sealed between two substrates which are at least partially transparent to allow direct visibility of said aqueous solution, wherein said aqueous solution comprises 0.5 to 45 parts by weight of an amphipathic substance which exhibits a clouding point, is an oil at room temperature and dissolves uniformly in water at room temperature, dissolved in 100 parts by weight of a solution of 0.5 to 40 parts by weight of an ionic water-soluble polymer or a vinyl-based non-ionic water-soluble polymer exhibiting no clouding point at a temperature of not higher than about 45° C. in 100 parts by weight of water, and said aqueous solution undergoes a temperature-dependent reversible sol-emulsion phase transition.

2. A laminated body according to claim 1, wherein the ionic water-soluble polymer is sodium carboxymethyl cellulose.

3. A laminated body according to claim 1, wherein the vinyl-based non-ionic water-soluble polymer is polyvinyl alcohol.

4. A laminated body according to claim 3, wherein 0.1 to 10 parts by weight of a neutral inorganic salt is added to 100 parts by weight of the water.

5. A laminated body according to claim 1, wherein the amphipathic substance contains at least oxypropylene groups.

6. A laminated body according to claim 5, wherein the amphipathic substance is modified dimethylpolysiloxane with addition of hydroxyethylene and hydroxypropylene.

7. A laminated body according to any one of claims 1 to 6, which comprises a combination of different aqueous solutions or a combination of an aqueous solution and a transparent liquid.

8. A laminated body according to any one of claims 1 to 6, which is provided with at least a heating element capable of heating.

9. A window employing a laminated body comprising an aqueous solution, in which molecules dissolved in water aggregate upon increasing temperature to demonstrate cloudy light-scattering resulting in a decrease in light transmittance, sealed between two substrates which are at least partially transparent to allow direct visibility of said aqueous solution, wherein said aqueous solution comprises 0.5 to 45 parts by weight of an amphipathic substance which exhibits a clouding point, is an oil at room temperature and dissolves uniformly in water at room temperature, dissolved in 100 parts by weight of a solution of 0.5 to 40 parts by weight of an ionic water-soluble polymer or a vinyl-based non-ionic water-soluble polymer exhibiting no clouding point at a temperature of not higher than about 45° C. in 100 parts by weight of water, and said aqueous solution undergoes a temperature-dependent reversible sol-emulsion phase transition.

10. A window according to claim 9, wherein the ionic water-soluble polymer is sodium carboxymethyl cellulose.

11. A window according to claim 9, wherein the vinyl-based non-ionic water-soluble polymer is polyvinyl alcohol.

12. A window according to claim 11, wherein 0.1 to 10 parts by weight of a neutral inorganic salt is added to 100 parts by weight of the water.

13. A window according to claim 9, wherein the amphipathic substance contains at least oxypropylene groups.

14. A window according to any one of claims 9 to 13, which comprises a combination of different aqueous solutions or a combination of an aqueous solution and a transparent liquid.

15. A window according to any one of claims 9 to 13, wherein at least one of the substrates is ultraviolet absorbing glass, and the ultraviolet absorbing glass is facing outward.

16. A window according to any one of claims 9 to 13, wherein at least one of the substrates is multilayered glass.

17. A window according to any one of claims 9 to 13, which is provided with at least a heating element capable of heating.

18. A window according to any one of claims 9 to 13, which is constructed into a unit comprising a combination of the laminated body with a construction material sash or vehicle frame.

* * * * *